United States Patent [19]

Maslak et al.

[11] Patent Number: 4,699,009
[45] Date of Patent: Oct. 13, 1987

[54] DYNAMICALLY FOCUSED LINEAR PHASED ARRAY ACOUSTIC IMAGING SYSTEM

[75] Inventors: Samuel H. Maslak; Hugh G. Larsen, both of Palo Alto, Calif.

[73] Assignee: Acuson, Mountain View, Calif.

[21] Appl. No.: 795,199

[22] Filed: Nov. 5, 1985

[51] Int. Cl.$^4$ .......................................... G01N 29/04
[52] U.S. Cl. ..................................... 73/626; 73/628; 73/641
[58] Field of Search ......................... 73/626, 628, 641; 367/105, 122, 103

[56] References Cited

U.S. PATENT DOCUMENTS

| | | | |
|---|---|---|---|
| 3,946,355 | 3/1976 | Bertolino | 367/122 |
| 4,140,022 | 2/1979 | Maslak | 73/626 |
| 4,224,829 | 9/1980 | Kawabuchi et al. | 73/626 |
| 4,550,607 | 11/1985 | Maslak et al. | 73/626 |
| 4,561,308 | 12/1985 | Bele et al. | 73/626 |

Primary Examiner—Anthony V. Ciarlante
Attorney, Agent, or Firm—James F. Mitchell

[57] ABSTRACT

An acoustic imaging system having an array of N transducers arranged for transducing transmit electrical signals into acoustic pulses and for transducing acoustic pulse echos into electrical receive signals has a transducer multiplexer that connects in substantially cyclic order any one of a selected group of M adjacent transducer elements to one of a plurality of substantially identical transmit or receive channels. Each channel includes phase changing means for dynamic focusing, such as a mixer driven by one of a plurality of individually phased clocks. A control demultiplier orders connection of an appropriate one of the differently phased clocks to the mixer of each channel in an order precisely corresponding to the cyclic ordering of the transducer connections by the transducer multiplexer as groups of M adjacent transducer elements are selected to form acoustic scan lines stepped across the entire array.

18 Claims, 10 Drawing Figures

DYNAMICALLY FOCUSED LINEAR PHASED ARRAY ACOUSTIC IMAGING SYSTEM

This invention relates generally to an acoustic imaging system and is an improvement upon the system disclosed in U.S. Pat. No. 4,140,022 issued Feb. 20, 1979 and entitled ACOUSTIC IMAGING APPARATUS that enables the system there disclosed to operate in the linear scanning mode with the inclusion of a simple programmable analog multiplexer.

BACKGROUND OF THE INVENTION

A sector phased array acoustic imaging system using phase changing means, heterodyning, tap selectors and a summing delay line is described in U.S. Pat. No. 4,140,022 issued Feb. 20, 1979 to Samuel H. Maslak entitled ACOUSTIC IMAGING APPARATUS. The phase changing means of that patented imaging system, including heterodyning means, connects between pairs of adjacent transducer elements and selected taps on a master summing delay line. The delay line taps are just close enough together to provide reasonable overlap of the pulse envelopes of the electrical signals received from individual transducer elements. Dynamic focusing is attained by adjusting the phases of the signals throughout reception using heterodyning means so that the cycles of carrier signal within the overlapped pulses have reasonable phase coherence, as is described in the patent.

However, that patented system cannot operate in a linear scanning mode, in which all acoustic scan lines are substantially parallel, without the addition of multiplexer means. That system could operate in the linear scanning mode in a known manner with the inclusion of a programmable analog multiplexer which is $M \times M$ in further conjunction with transducer switching means as described in U.S. Pat. No. 4,224,829. Construction of a $M \times M$ analog multiplexer is expensive, since M is typically 64 or so for a high performance system, and is complex hardware since full bandwidth and dynamic range of the low-level transducer outputs must be preserved.

SUMMARY OF THE INVENTION

This invention improves upon the imaging system of U.S. Pat. No. 4,140,022 to enable operation of that system in the linear scanning mode by replacement of the $M \times M$ analog multiplexer with digital control circuitry which avoids switching the analog signal path. This circuitry may also be duplicated to operate on the transmit control signals. Collectively, this digital control circuitry is called "control demultiplexing."

A principal object of this invention is a modification of the system described in U.S. Pat. No. 4,140,022 to enable efficient operation in the linear scanning mode.

Another object of the invention is to provide a simple and generally applicable demultiplexing system by ordering of the control signals applied to identical channels that process the transducer transmit input signals or received outputs in a manner precisely corresponding to the scrambling that occurs by multiplexing groups of adjacent transducers operating in the linear scanning mode.

Objects of the invention also are the cost savings and improved performance realized by the invention compared to use of a signal demultiplexer for switching low-level analog signals.

Other objects and advantages of this invention will become apparent upon consideration of the following description of a preferred embodiment and the accompanying drawings.

DESCRIPTION OF THE PREFERRED EMBODIMENT

Figure 1:
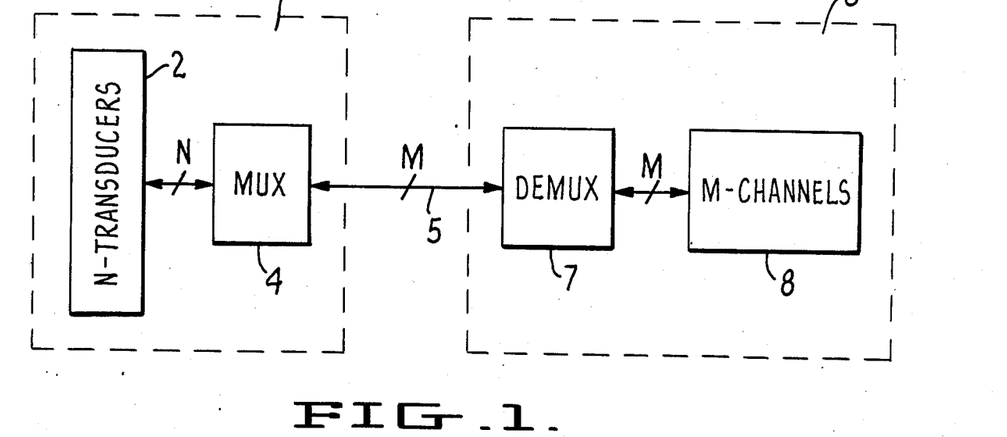
FIG. 1 schematically illustrates a planar linear array imaging system using a signal multiplexer and demultiplexer.
Figure 2:
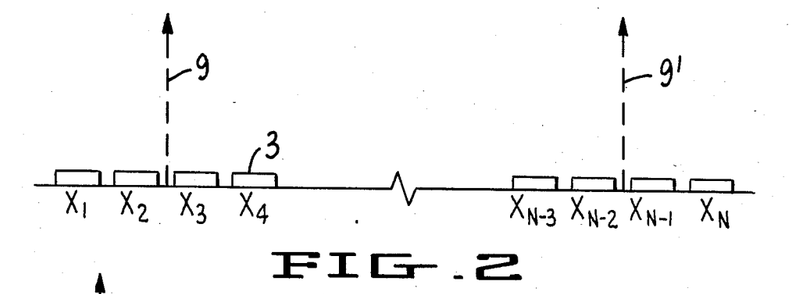
FIG. 2 illustrates in cross section a planar linear array of N transducers.

FIG. 1 illustrates the functional components for a linear scanning mode, including a transducer assembly 1 comprising a linear array 2 of N individual transducers 3, as shown in FIG. 2, and a digitally controlled analog multiplexer 4, for example, as described in U.S. Pat. No. 4,224,829. The multiplexer 4 selects a group of M adjacent transducers 3 from a substantially larger number N for connection to an M-wire transducer cable 5. The transducer cable 5 thus connects the transducer assembly 1 to signal processing components 6 in the imaging system. These signal processing components 6 may comprise a signal demultiplexer 7, which unscrambles the M multiplexed transducer signals, and an M-channel dynamic focusing component 8, such as is described in U.S. Pat. No. 4,140,022.

Means to achieve appropriate demultiplexing of the multiplexed signals from the transducer assembly 1 are essential for proper phase alignment as is performed in the focusing component 8. In the prior art, this means consists of an array of $M \times M$ analog switches which are under digital control. Each analog switch, when enabled, operates on the resultant signal of a single transducer signal prior to any coherent summation with signals from other transducers. Therefore, the full dynamic range and bandwidth of each relatively low-level signal must be preserved in the analog switch. Also, since M is typically 32, 64 or 128 or so for a high performance imaging system, several thousand of these switches are typically required.

Figure 3:
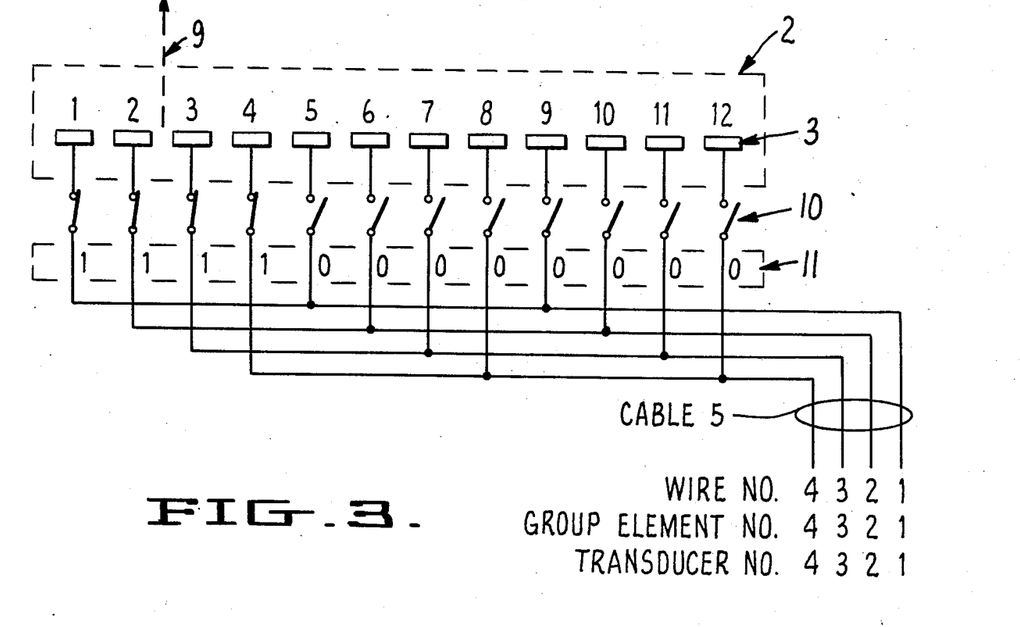
FIG. 3 illustrates a 12 to 4 cyclic multiplexer selecting group 1 for connection to a four-wire transducer cable.
Figure 4:
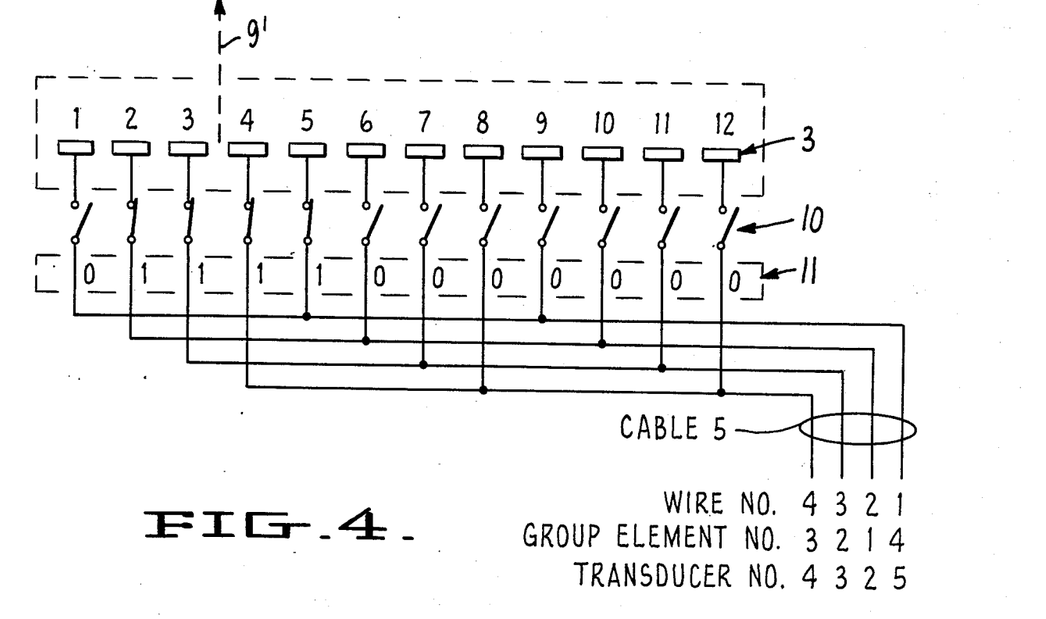
FIG. 4 illustrates a 12 to 4 cyclic multiplexer shown selecting group 2 for connection to the cable.
Figure 5:
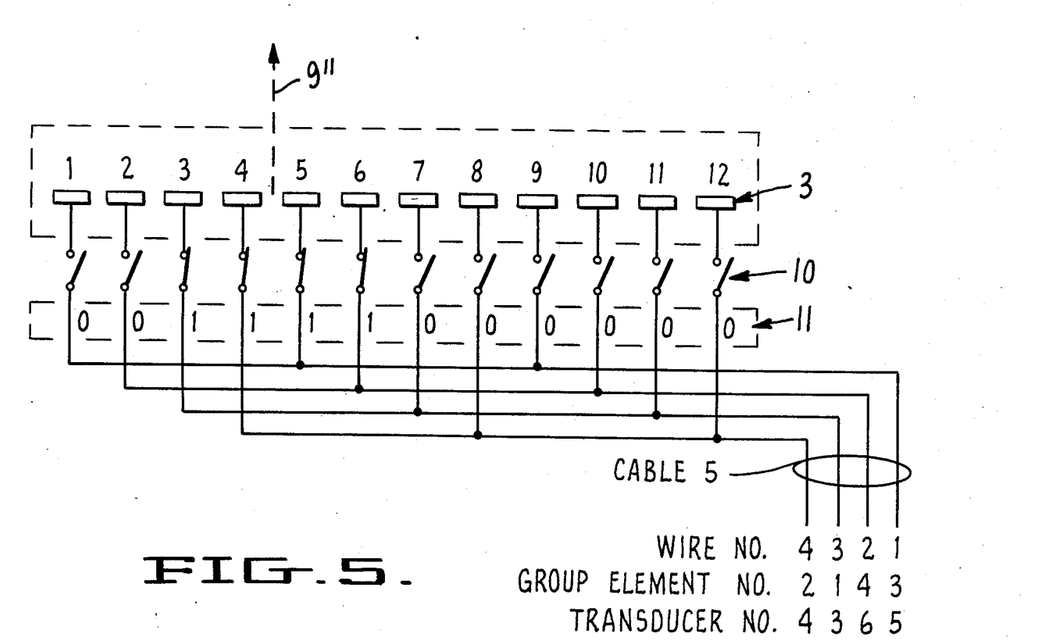
FIG. 5 illustrates a 12 to 4 cyclic multiplexer shown selecting group 3 for connection to the cable.

The multiplexing, as will be apparent from a consideration of FIGS. 3, 4 and 5, scrambles the order of connection of a transducer output in a predetermined cyclic pattern to any particular one of the M wires in the transducer cable 5. FIG. 3 illustrates operation of the multiplexer in the simple case of an array 2 consisting of twelve transducers 3 connected in groups of four to a four-wire transducer cable 5 by the multiplexer 4. The multiplexer 4 is essentially a set of programmed switches 10 that close to connect a particular transducer 3 to one of the wires numbered 1 through 4 in the transducer cable 5. In FIG. 3 a first group of four transducers 1 through 4 connects by multiplexer switches 10 to the set of wires in the order shown, i.e. transducer 1 connects to wire 1, transducer 2 connects to wire 2 and so forth.

The multiplexer then selects, for example, the second group of four transducers in FIG. 4 comprising transducers 2, 3, 4 and 5. In this instance transducers 2, 3 and 4 remain connected to the same numbered wire in the transducer cable but multiplexer switch 10 to transducer 1 opens to disconnect transducer 1 from wire 1 and the switch to transducer 5 closes to connect transducer 5 to wire 1.

Then, in FIG. 5, the multiplexer connects the next group of four transducers 3, 4, 5 and 6 to the transducer cable wires. Transducers 3, 4 and 5 remain connected as before. But multiplexer switch 10 to transducer 2 opens and that to transducer 6 closes whereby transducer 6 becomes connected to wire 2 and transducer 2 is disconnected.

Thus, as has been described, for a linear scanning mode the transducer multiplexer 4 connects the signals from each transducer 3 to a particular wire in cable 5 with a cyclic ordering, grouping four adjacent transducer elements from the first to the last transducer element in the array. The multiplexer transistors or other switches 10 respond to the output of a shift register 11 by shifting "one" into the shift register locations corresponding to the desired group of M elements and shifting "zeros" into all other shift register locations. Each "one" turns the multiplexer switch 10 "on" and each "zero" turns the multiplexer switch "off."

Other types of multiplexers could also be used, which might be complex $N \times M$ arrays of switches that would not cause the ordering to be cyclic. The invention described herein applies to simple multiplexers of any type wherein the reordering is a substantially cyclic, predetermined scrambling of the transducer signals, which are then unscrambled by control demultiplexing to avoid use of a complex $M \times M$ analog multiplexer.

The prior art $M \times M$ analog demultiplexer 7 described above can be replaced by digital control signals which operate on the analog signals in systems such as the one described in U.S. Pat. No. 4,140,022.

Figure 6:
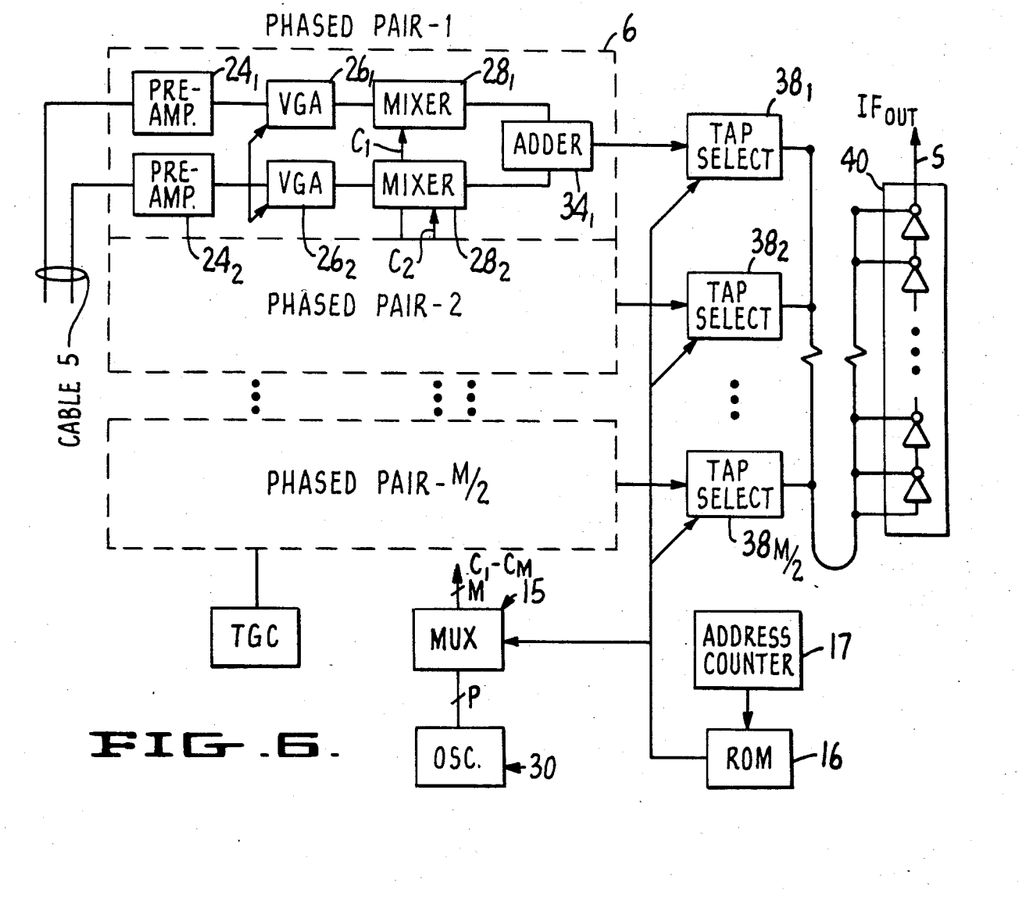
FIG. 6 is a simplified block diagram of portions of the circuitry described in U.S. Pat. No. No. 4,140,022 modified for operation in the linear scanning mode.

As illustrated in FIG. 6 in block diagram form, a digitally controlled multiplexer 15 routes the clock signals $C_1$ through $C_M$ to the mixers 28 in order to achieve phase coherence between signals from pairs of adjacent transducers. The oscillator 30 produces a set of p unique signals, each of which has the same frequency but may have different phase relationships with one another. For each of the M mixers, one of the p clock signals is selected by the multiplexer 15 and is routed to the mixer. The same clock signal may be routed to more than one mixer at the same time. There is no relationship between the number of unique clock signals, p, and the number of channels, M. These control signals may be applied in such a way that precisely accounts for the cyclic ordering of the signals which are received from the transducer multiplexer 4. The control signals are derived from digital information read from ROM or RAM digital memory 16. Values are accessed sequentially by address counter 17 which permits formation of the clock signals that are then applied to mixers $28_1$ through $28_M$. The clock signals can be the phased outputs of a digital oscillator 30 as described in U.S. Pat. No. 4,140,022. If the address counter 17 is appropriately initialized for each acoustic scan line, taking into account the predetermined cyclic multiplexing of multiplexer 4, then demultiplexing occurs in a way which is fuctionally equivalent to actual switching of the M analog signals as would otherwise be done with an $M \times M$ analog demultiplexer. This digital control circuitry is collectively called "control demultiplexing."

In FIG. 6 each signal processing channel includes variable gain amplifier $26_1$-$26_M$ that may have time gain compensation for attenuation of the ultrasonic energy as a function of distance in the scanned body. The demultiplexed outputs of the phase changing mixers $28_1$-$28_M$ are combined in adders 34 and then supplied to tap selectors 38 on a summing delay line. The output of the summing delay line is then subject to subsequent processing such as detection, amplification, etc., for ultimate display.

The technique illustrated in FIG. 6 is general and can be applied to many different types of systems. The principle involved is the provision of a plurality of substantially identical signal processing channels and the provision of control signals to each channel that are ordered to precisely compensate for the predetermined ordering that occurs in the transducer multiplexer 4.

Although FIG. 6 illustrates control demultiplexing applied to the system of U.S. Pat. No. 4,140,022 with the channels thereof being arranged in phased pairs, this invention applies equally well in K-tuples where K might be 1,2,3,4 or more. Each channel includes a preamplifier with protection circuit 24, a variable gain amplifier 26, followed by mixer 28, the outputs of which are combined in an adder 34. The intermediate frequency output of each adder 34 supplies a matrix switch or the tap selector 38 described in U.S. Pat. No. 4,140,022. The digitally controlled multiplexer 15 selects and routes one of the plurality of individual clock signals from oscillator 30 for connection to mixers 28. The multiplexer 15 also supplies corresponding control signals to tap selectors $38_1$-$38_{M/2}$ for each phased pair to connect its output to the set of taps in master delay line 40 which cover the delay range with sufficiently fine quantization for each selected transducer group so as to provide signal overlap at the summing point S.

Placement of tap selectors 38 after the mixers 28 in the signal flow path combined with the here-described ordering of processing channel and tap selector controls allows the system shown in U.S. Pat. No. 4,140,022 to operate in the linear scanning mode as described herein as well as the sector phased array imaging mode described in that patent.

Figure 7A:
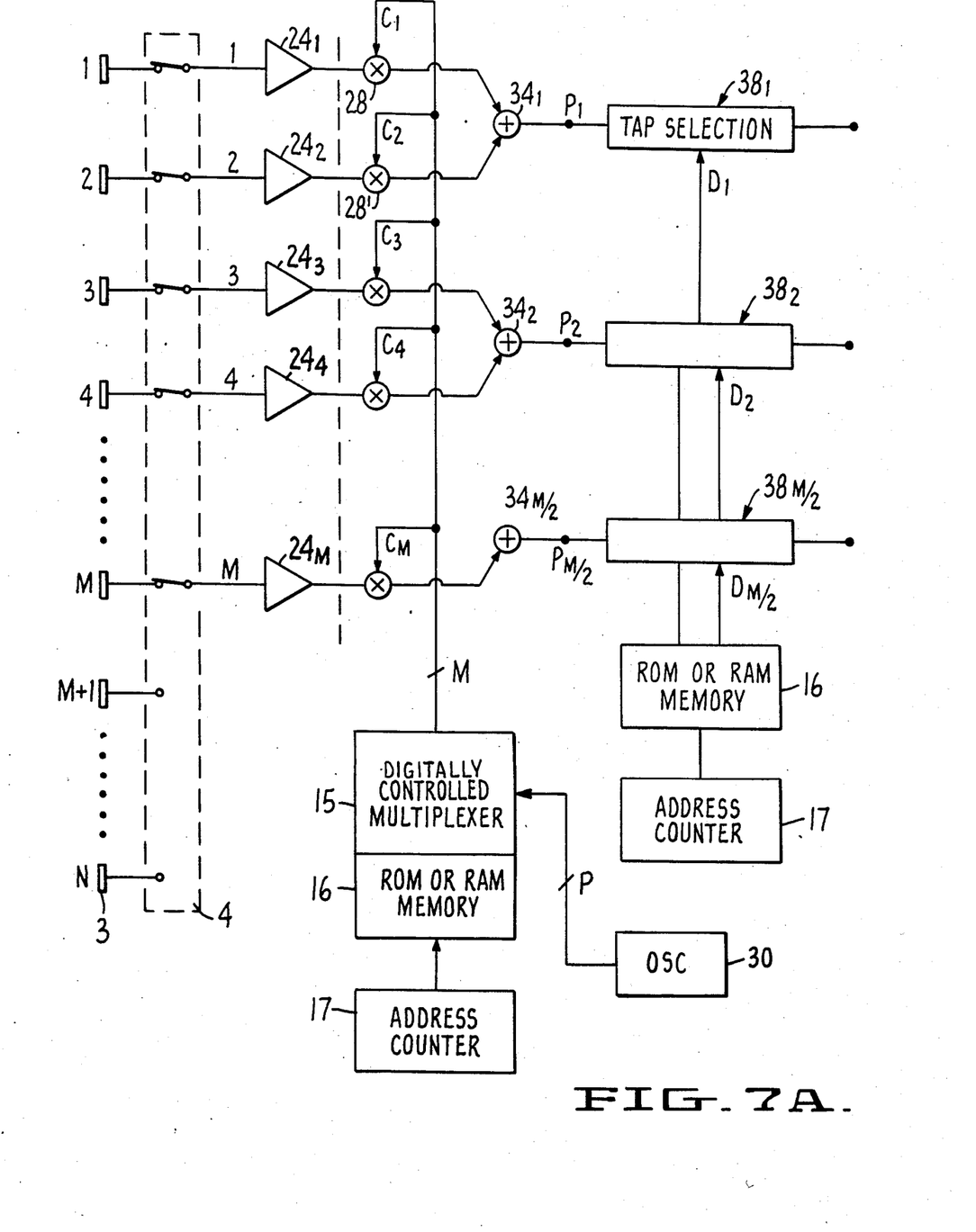
FIGS. 7A, 7B, 7C and 7D illustrate the functional manner and means for demultiplexing several consecutive configurations of multiplexed receive signals.

To see how control demultiplexing works in a functional sense, consider FIGS. 7A through 7D, which show the result of the control demultiplexing for several consecutive configurations. FIG. 7A shows connection between the first M transducers 3 to the corresponding M connections on the multiplexer 4. The signal received from each transducer is mixed and phase shifted with control signals $C_1$-$C_M$. The control signals $C_1$-$C_M$ are not necessarily all different but are selected ones of the available phased outputs of the digital oscillator 30. There may be only p unique control signals corresponding to p phases of the oscillator where p<M. The resultant analog signals are combined as phased pairs at adders $34_1$-$34_{M/2}$ to produce phased intermediate frequency signals $P_1$-$P_{M/2}$. Each of these is now given the appropriate delay through tap selection means 38 controlled by signals $D_1$-$D_{M/2}$ from memory 16 and address counter 17.

Figure 7B:
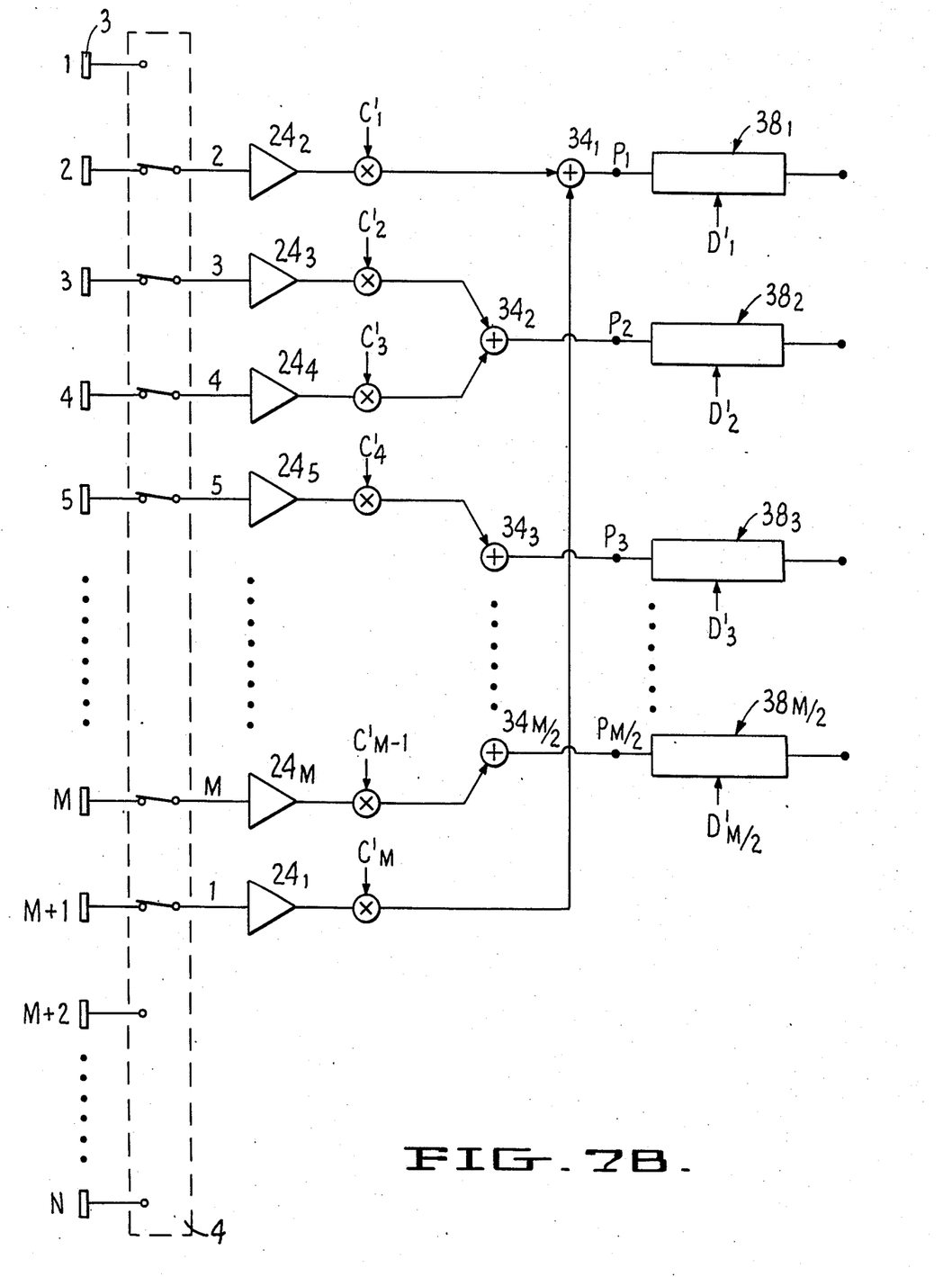

FIG. 7B shows transducers 2 through M+1 connected via the multiplexer 4 to the appropriately numbered wires, as discussed previously. In this case, control signals $C'_1$-$C'_M$ which might in general differ from signals $C_1$-$C_M$ are read from ROM or RAM memory 16 to maintain coherence between appropriate pairs of elements. In particular, the signals generated from transducers 2 and M+1 are phase coherent when the scan lines are normal or nearly normal to the transducer face of a planar linear array of transducers. These signals are then combined at adder $34_1$ to produce phased intermediate frequency signal $P_1$ which is connected to summing delay line 40 of FIG. 6 by tap selector $38_1$.

Figure 7C:
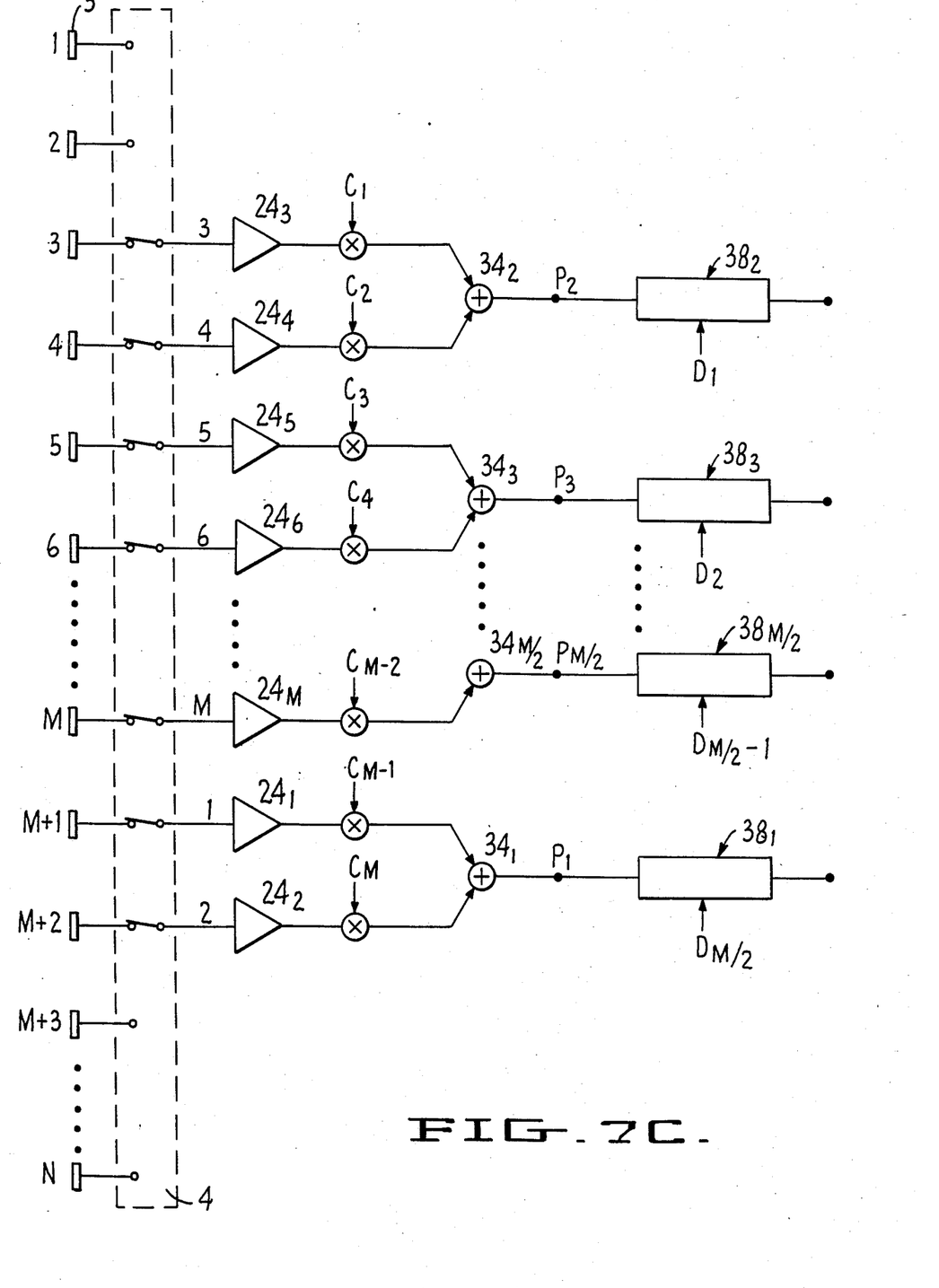
Figure 7D:
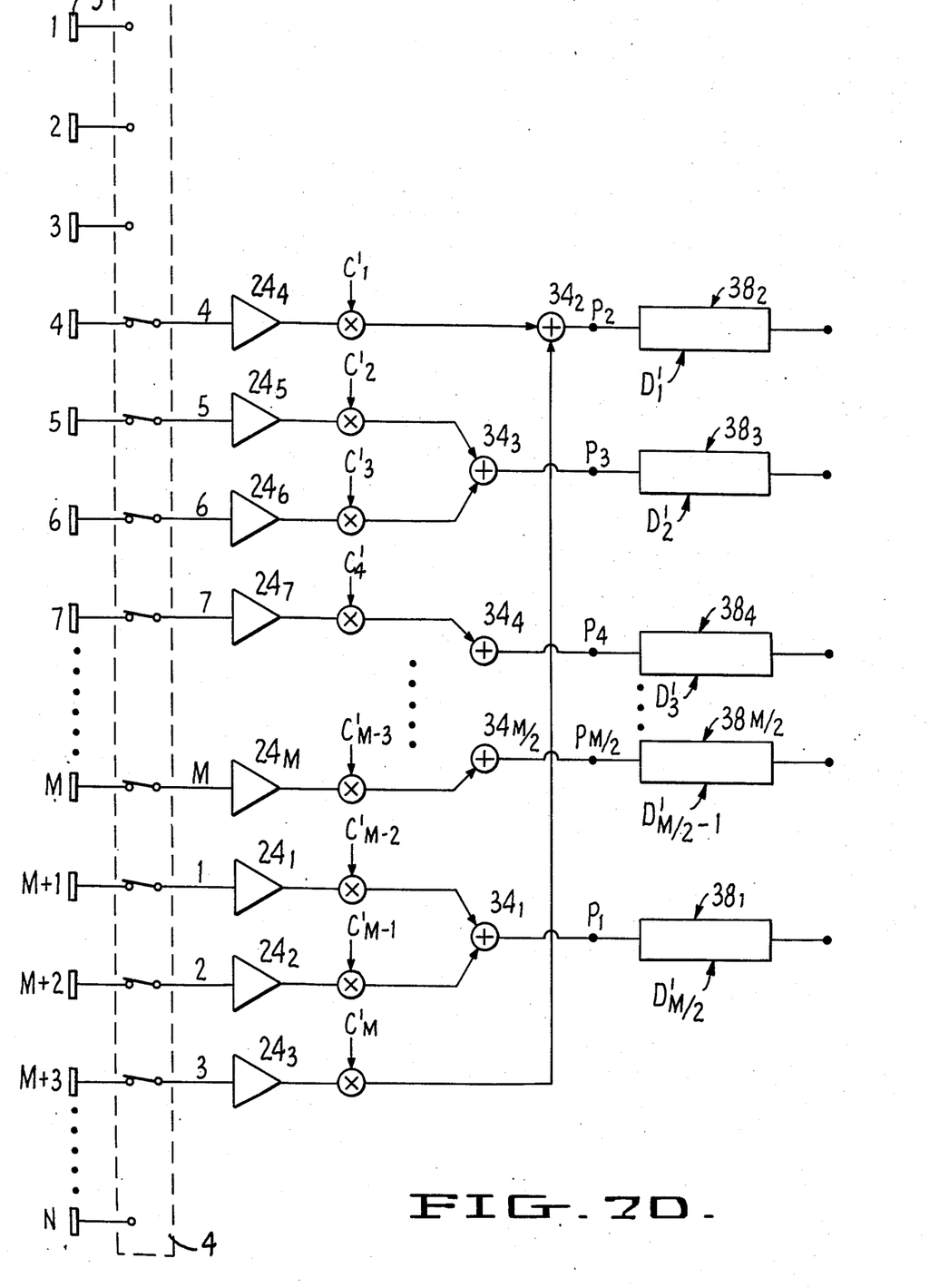

FIG. 7C shows transducer M coupled to the preceding transducer and transducers M+1 and M+2 coupled in phased pairs by adders $34_{M/2}$ and $34_1$, respectively. Finally, FIG. 7D shows transducer 4 coupled to transducer M+3 at adder $34_2$. The sequence continues until the entire array is scanned.

The linear scanning mode is not limited to the case shown in FIG. 2 with scan lines 9—9' parallel and at right angles to a line connecting the face of each transducer, but parallel or nearly parallel scan lines may be at any predetermined angle to the array normal. Parallel scanning at a predetermined angle substantially different from the array normal may introduce excessive delay between the outer transducer elements for certain transducer groups (e.g. transducer elements 2 and M+1 in FIG. 7B and transducer elements 4 and M+3 in FIG. 7D). For these certain transducer groups, one of the outer transducer elements (e.g. transducer element M+1 in FIG. 7B and element M+3 in FIG. 7D) may be turned "off" using apodizing means or by opening the appropriate transducer multiplexer switch.

In the linear scanning mode of FIG. 7A with scan lines normal to the transducer face, transducer signals generated from transducers 1 and M are essentially adjacent in that these signals are not separated by substantial time delay. Further, the same set of control signals, namely $C_1$-$C_M$ are used in the configurations shown in FIGS. 7A and 7C. Similarly, the same set of control signals, namely $C'_1$-$C'_M$ are used in the configurations of FIGS. 7B and 7D. It is the function of the address counter 17 to determine when each predetermined set of control signals is required. A similar set of control signals, such as $D_1$-$D_{M/2}$ or $D'_1$-$D'_{M/2}$ are also required to sepcify the tap selection for connection to the summing delay line 40. The above examples specified the sets of control signals in the case of phased pairs. In the case of phased triplets or K-tuplets, additional sets would be required.

Although application of "control demultiplexing" has been shown for the receive channels, it may also be applied to transmit channels using a different set of control signals in a different control memory. Steering and focusing data supplied to the individual transmit channels for the transducers 3 is scrambled by another digitally controlled multiplexer in a fashion which will be unscrambled by the multiplexer 4 that has been previously described.

Various modifications of the invention become apparent. For example, even fewer tap selectors are needed if the identical processing channels are arranged in phased triples or Ktuples. Similarly, various transducers of a group may be apodized "off" by providing distinct time gain compensation signals (TGC) to variable gain amplifiers 26 or by operating the mixer clocks at frequencies which produce signals outside the passband of the channel.

Furthermore, the "control demultiplexer" means described may be applied to system architectures other than one requiring the described tap selectors. For example, "control demultiplexing" can be used with the architecture described in copending U.S. application Ser. No. 607,670 filed May 7, 1984 and entitled PHASED ARRAY ACOUSTIC IMAGING SYSTEM, now U.S. Pat. No. 4,550,607 issued Nov. 5, 1985.

These and other variations are within the scope of the invention defined in the following claims.

We claim:

1. In acoustic imaging apparatus having means for repeatedly transmitting pulses of acoustic pressure waves into a body to be examined, an array of transducers for transducing acoustic pulse echos that impinge on each of them into corresponding electrical signals, the improvement for scanning the array in linear imaging mode comprising
    (a) a plurality of substantially identical transducer output processing channels;
    (b) transducer multiplexer means connecting individually the output of each transducer in a selected group of adjacent transducers from the array to one of said output processing channels in a substantially cyclic order; and
    (c) control demultiplexer means ordering the control signals applied to each channel in a sequence that precisely compensates for the cyclic ordering of the transducer outputs connected to that channel by said transducer multiplexer.

2. The acoustic imaging apparatus of claim 1, and further comprising
    a summing delay line causing the processed received signal for each transducer to arrive at the summing point in time overlapped relationship including
    a plurality of delay cells forming the summing delay line in selective sequence.

3. In acoustic imaging apparatus having means for repeatedly transmitting pulses of acoustic pressure waves into a body to be examined, an array of transducers for transducing acoustic pulse echos that impinge on each of them into corresponding electrical signals, a plurality of phase changing means each having an input and an output, delay means providing different amounts of delay between an input and a summing poinT, means for coupling the output of each phase changing means to an input of said delay means so that electrical signals during a given period at the summing point are in overlapped relationship and have substantial phase coherence, the improvement comprising
    (a) transducer multiplexer means connecting individually the output of each transducer in a selected group of adjacent transducers from the array to one of the plurality of phase changing means in a substantially cyclic order; and
    (b) control demultiplexer means (1) for adjusting each phase changing means in a sequence that precisely compensates for the substantially cyclic ordering of the transducer outputs connected to it by the transducer multiplexing means and (2) for coupling the outputs of the phase changing means to corresponding preselected amounts of delay in the delay means.

4. The acoustic imaging apparatus of claim 1 or 3 wherein the array of transducers is a planar linear array.

5. The acoustic imaging apparatus of claim 3 wherein the phase changing means are mixers driven by a selectable one of a plurality of individually phased clock signals and the control demultiplexer connects to each mixer the phased clock signal which achieves substantial phase coherence of overlapped electrical signals reaching the summing point.

6. The acoustic imaging apparatus of claim 5 wherein the delay means is a tapped summing delay line and the control demultiplexer connects the output of each mixer to a set of taps which covers the delay range with sufficiently fine quantization for the selected transducer group.

7. The acoustic imaging apparatus of claims 1 or 3, said control demultiplexer means having a memory and being digitally controlled to provide substantially the same data from the same memory locations to at least two different channels on different scan lines, the reordering of data to different channels compensating for the ordering of signals caused by said transducer multiplexer means.

8. Apparatus for processing electrical signals for use in acoustic imaging and comprising
  (a) multiplexer means for connecting a selected group of signals from a much larger array of signals to one of a plurality of output channels; and
  (b) a signal processor for processing the signals in a manner that precisely compensates for the cyclic ordering of the group of signals, said processor comprising a digitally controlled multiplexer means, a digital memory for storing signals to operate said multiplexer, and an address counter for accessing sequentially said memory.

9. The apparatus of claim 8, and further comprising a tap selector means for connecting the processed signals to a master delay line.

10. The apparatus of claim 8, and further comprising a summing delay line causing the processed signal for
  each transducer to arrive at a summing point in time overlapped relationship including
  a plurality of delay cells forming the summing delay line in selective sequence.
    (a) delay cell input summing means for at least one of (1) a signal derived from the processed signal of at least one transducer, (2) an inselected signal, (3) the output of a first adjacent delay cell or (4) the output of a second adjacent delay cell to produce a delay cell summed input signal,
    (b) delay cell output switch means, and
    (c) at least one discrete delay element connecting the delay cell summed input signal to the delay cell output switch to form a delay cell output, said delay cell output switch selectively connecting the delay cell output to any one of (1) the input summing means of a first adjacent delay cell, or (2) the input summing means of a second adjacent delay cell or (3) an outselection path; and
  a digital control means for coordinating the position of the output switch means for each delay cell to configure the delay line in a preselected manner for each particular scan line of said transducer array.

11. In acoustic imaging apparatus having means for repeatedly transmitting pulses of acoustic pressure waves into a body to be examined including an array of transducers for transducing electrical transmit signals into acoustic pulses, the improvement for scanning the array in linear imaging mode comprising
  (a) a plurality of substantially identical transducer transmit channels;
  (b) transducer multiplexer means connecting individually each transducer in a selected group of adjacent transducers from the array to one of said transmit channels in a substantially cyclic order; and
  (c) control demultiplexer means ordering the control signals applied to each channel in a sequence that precisely compensates for the cyclic ordering of the transducers connected to that channel by said transducer multiplexer.

12. In acoustic imaging apparatus having means for repeatedly transmitting pulses of acoustic pressure waves into a body to be examined, an array of transducers for transducing electrical transmit signals into acoustic pulses and for transducing acoustic pulse echos that impinge on each of them into corresponding electrical receive signals, the improvement for scanning the array in linear imaging mode comprising
  (a) a plurality of substantially identical transducer transmit channels;
  (b) a plurality of substantially identical transducer receive channels;
  (c) transducer multiplexer means connecting individually each transducer in a selected group of adjacent transducers from the array to one of said transmit channels and to one of said receive channels in a substantially cyclic order;
  (d) a first control demultiplexer means ordering the control signals applied to each transmit channel in a sequence that precisely compensates for the cyclic ordering of the transducers connected to that transmit channel by said transducer multiplexer; and
  (e) a second control demultiplexer means ordering the control signals applied to each receive channel in a sequence that precisely compensates for the cyclic ordering of the transducer outputs connected to that channel by said transducer multiplexer.

13. In acoustic imaging apparatus having means for repeatedly transmitting pulses of acoustic pressure waves into a body to be examined, an array of transducers for transducing acoustic pulse echos that impinge on each of them into corresponding electrical signals, the improvement for scanning the array in linear imaging mode comprising
  (a) a plurality of substantially identical transducer output processing channels; and
  (b) control demultiplexer means ordering the control signals applied to each channel in a sequence that precisely compensates for the cyclic ordering of the transducer outputs connected to that channel.

14. The acoustic imaging apparatus of claim 13 wherein each transducer output processing channel includes phase changing means and tap selecting means for coupling the phase changing means to one of the input taps of a delay means providing different discrete amounts of delay between its input taps and a scanning point,
  and wherein said control demultiplexer orders the control signals to said phase changing means and to said tap selecting means.

15. In acoustic imaging apparatus having means for repeatedly transmitting pulses of acoustic pressure waves into a body to be examined including an array of transducers for transducing electrical transmit signals into acoustic pulses, the improvement for scanning the array in linear imaging mode comprising (a) a plurality of substantially identical transducer transmit channels; and
(b) control demultiplexer means ordering the control signals applied to each channel in a sequence that precisely compensates for the cyclic ordering of the transducers connected to that channel.

16. In acoustic imaging apparatus having means for repeatedly transmitting pulses of acoustic pressure waves into a body to be examined, an array of transducers for transducing electrical transmit signals into acoustic pulses and for transducing acoustic pulse echos that impinge on each of them into corresponding electrical receive signals, the improvement for scanning the array in linear imaging mode comprising
    (a) a plurality of substantially identical transducer transmit channels;
    (b) a plurality of substantially identical transducer receive channels;
    (c) a first control demultiplexer means ordering the control signals applied to each transmit channel in a sequence that precisely compensates for the cyclic ordering of the transducers connected to that transmit channel; and
    (d) a second control demultiplexer means ordering the control signals applied to each receive channel in a sequence that precisely compensates for the cyclic ordering of the transducer outputs connected to that channel.

17. The acoustic imaging apparatus of claim 16 wherein each transmit and receive channel includes phase changing means and tap selecting means for coupling the phase changing means to one of the input taps of a delay means providing different discrete amounts of delay between its input taps and a scanning point,
    and wherein said first and second control demultiplexers order the control signals to said phase changing means and to said tap selecting means, respectively, in said transmit and said receive channels.

18. In acoustic imaging apparatus having means for repeatedly transmitting pulses of acoustic pressure waves into a body to be examined, an array of transducers for transducing acoustic pulse echos that impinge on each of them into corresponding electrical signals, the improvement for scanning the array in linear imaging mode comprising
    (a) a plurality of substantially identical transducer output processing channels;
    (b) transducer multiplexer means connecting individually the output of each transducer in a selected group of adjacent transducers from the array to one of said output processing channels in preselected order; and
    (c) control demultiplexer means ordering the control signals applied to each channel in a sequence that precisely compensates for the ordering of the transducer outputs connected to that channel by said transducer multiplexer.

* * * * *